US010830660B2

(12) United States Patent
Miller et al.

(10) Patent No.: US 10,830,660 B2
(45) Date of Patent: Nov. 10, 2020

(54) LEAK DETECTION OF GAS CONTAINERS USING AN OPTICAL DETECTOR

(71) Applicant: Cascade Technologies Holdings Limited, Stirling (GB)

(72) Inventors: Paul Miller, Stirling (GB); Graeme Walker, Stirling (GB); Iain Howieson, Stirling (GB); Ruth Lindley, Stirling (GB)

(73) Assignee: Cascade Technologies Holdings Limited, Stirling (GB)

( * ) Notice: Subject to any disclaimer, the term of this patent is extended or adjusted under 35 U.S.C. 154(b) by 7 days.

(21) Appl. No.: 14/883,125

(22) Filed: Oct. 14, 2015

(65) Prior Publication Data

US 2017/0108397 A1 Apr. 20, 2017

(51) Int. Cl.
*G01M 3/04* (2006.01)
*G01M 3/38* (2006.01)
*G01M 3/16* (2006.01)
*G01M 3/22* (2006.01)

(52) U.S. Cl.
CPC ........... *G01M 3/04* (2013.01); *G01M 3/16* (2013.01); *G01M 3/38* (2013.01); *G01M 3/229* (2013.01)

(58) Field of Classification Search
CPC ....... G01M 3/16; G01M 3/38; G01M 3/04–40
USPC .......................................................... 73/49.3
See application file for complete search history.

(56) References Cited

U.S. PATENT DOCUMENTS

| 3,675,469 A * | 7/1972 | Macartney | G01M 3/226 73/40.7 |
| 3,956,923 A * | 5/1976 | Young | G01M 3/202 73/49.3 |
| 2005/0157303 A1* | 7/2005 | Langford | B82Y 20/00 356/437 |
| 2007/0030865 A1* | 2/2007 | Day | H01S 5/02415 372/4 |
| 2010/0198736 A1* | 8/2010 | Marino | G06Q 40/04 705/308 |
| 2015/0083918 A1 | 3/2015 | Emmenegger et al. | |

OTHER PUBLICATIONS

European Search Report for EP 16 19 3334 dated Feb. 28, 2017.

* cited by examiner

*Primary Examiner* — Nathaniel J Kolb
(74) *Attorney, Agent, or Firm* — Moore & Van Allen PLLC; W. Kevin Ransom (57) ABSTRACT

A leak detection system comprising a substantially sealed accumulation chamber adapted to accommodate a single gas container, the accumulation chamber being sealed so that when a gas container is in the accumulation chamber gas leaked from that container accumulates. An optical detector is provided for detecting leaked gas, the detector including an optical cell. A controller directs a reference sample to the optical cell and subsequently directs a sample from the from the accumulation chamber to the optical cell. The optical detector is operable use both the reference sample and the accumulation chamber sample to detect leaked gas.

4 Claims, 7 Drawing Sheets

LEAK DETECTION OF GAS CONTAINERS USING AN OPTICAL DETECTOR

FIELD OF THE INVENTION

The present invention relates to a leak detection system for the analysis of leaks in pressurised metered dose inhaler aerosol cans.

BACKGROUND OF THE INVENTION

Pressurised metered dose inhaler (pMDI) aerosol canisters are filled with a mixture of propellant and active ingredient. Legislation dictates a maximum leak rate of the combined propellant/ingredient, typically measured in mg/day or g/year, for each product. Canisters found to be leaking at a rate greater than this should be eliminated from production batches upon detection. The specific leak rate is subject to the product type/canister size but is in the order of 1 mg/day.

To carry out precision leak rate measurements at rates as low as 1 mg/day, the method most commonly used involves weighing a can in a controlled environment, allowing the can to rest for 2-3 days and weighing the can again. However, this method is only able to provide an average leak rate, has poor repeatability and offers no indication as to the location of the leak.

Immersing a can in water for a period of hours or days can offer insight to the location of the leak. However, the act of immersion has been found to influence the leak being assessed, and for leak rates below 10 mg/day can take hours or days to complete. In addition, many propellants are water soluble and at low leak rates can dissolve into the water, rather than forming a visible bubble. U.S. Pat. No. 3,956,923 describes a process and apparatus for detecting gas leaks in filled, pressurized containers.

SUMMARY OF THE INVENTION

Aspects of the present invention are in accordance with the appended independent claim. A leak detection system comprising a substantially sealed accumulation chamber adapted to accommodate a single gas container, the accumulation chamber being sealed so that when a gas container is in the accumulation chamber gas leaked from that container accumulates; an optical detector for detecting leaked gas, the detector including an optical cell and a controller for directing a background reference sample to the optical cell and subsequently directing a sample from the accumulation chamber to the optical cell, wherein the optical detector is operable use both the reference sample and the accumulation chamber sample to detect leaked gas is described. Preferably, the optical detector is operable to measure light intensity.

The leak detection system of the invention samples air around the can to determine the presence of leaked propellant or product in the volume of air around the can. The response of the system is proportional to the amount of propellant in the volume. The amount of propellant in the volume is proportional to the magnitude of the leak and the duration of the accumulation. Using the system, leak rate measurements that traditionally take days can be taken in seconds.

The controller may be operable to selectively open the accumulation chamber after a pre-determined accumulation time. Preferably, the accumulation time is in the range of 2 seconds to 600 seconds. Ideally, the accumulation time is in the range of 2 seconds to 100 seconds, for example 2 seconds to 60 seconds.

The sealed accumulation chamber may be shaped such that when the article being leak tested is in situ two or more independent accumulation chambers are defined.

The accumulation chamber may be shaped to accommodate an aerosol canister that has a valve and a crimp. The accumulation chamber may be shaped such that a valve accumulation chamber wholly enclosing the valve is defined and a crimp accumulation chamber is defined wholly enclosing the crimp. In this case, by sampling gas accumulated in the valve accumulation chamber separately from gas accumulated in the crimp accumulation chamber both the magnitude and location of leaks in pressurised vessels such as pMDI cans and domestic aerosols can be accurately and quickly assessed. The ability to identify the location of the leak (i.e. crimp or valve) is a significant technical advantage.

The optical detector may comprise a laser. The laser may comprise a quantum cascade laser.

A leak detection system comprising an accumulation chamber adapted to accommodate a single gas container, so that when a gas container is in the accumulation chamber, gas leaked from that container accumulates; wherein the accumulation chamber is adapted so that when the container is in the chamber at least two different accumulation chambers are defined is described. A detector, preferably an optical detector, is provided to detect the presence of leaked gas in the at least two different accumulation chambers.

The gas container may be an aerosol canister that has a valve and a crimp. The accumulation chamber may be shaped such that a valve accumulation chamber is defined and a crimp chamber is defined. In this way, gas in the valve accumulation chamber and the crimp chamber can be sampled independently. This provides a simple and effective technique for identifying the location of a leak.

BRIEF DESCRIPTION OF THE DRAWINGS

Various aspects of the invention will now be described by way of example only, and with reference to the following drawings, of which.

DETAILED DESCRIPTION OF THE DRAWINGS

Figure 1:
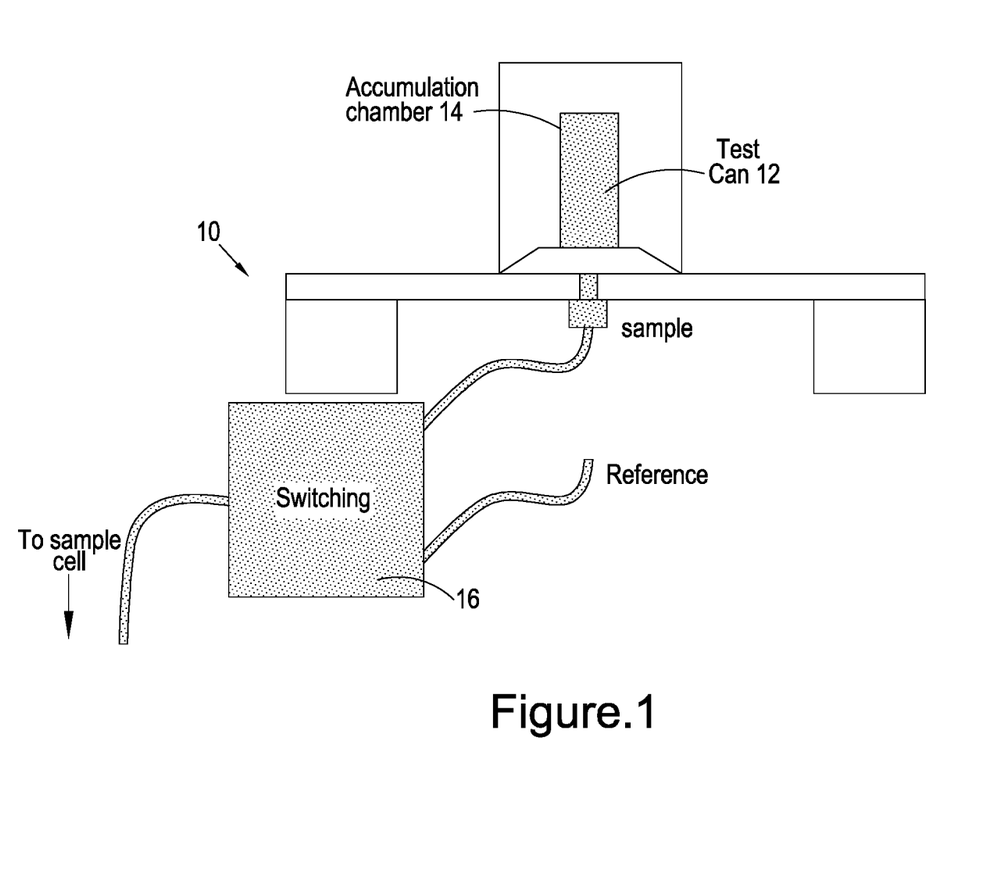
FIG. 1 is a schematic diagram of a leak detection system for detecting leaks in aerosol cans.

FIG. 1 shows a leak test system 10 for detecting leaks in a canister 12. The system 10 has a laser based sensor capable of detecting leakages from a canister, a substantially sealed accumulation chamber 14 for concentrating leakage from the canister and a pump plus sampling system (not shown) to draw gas samples from the accumulation chamber 14 into the sensor and from a background reference gas source into the sensor.

The accumulation chamber 14 is shaped to accommodate a single can 12. The accumulation chamber 14 is sealed and wholly encloses the can, so that any gas leaking from the can is accumulated within the chamber. The accumulation chamber 14 is defined by an upper part that fits over the can and a base part that supports the can in an upright position. Between the upper part and the base part is an o-ring that forms an airtight seal when the two parts are fitted together. The o-ring can be provided on either the upper part or the base part. The internal volume of the accumulation chamber 14 has to be as low as possible without obstructing gas flow. This ensures a highly localised concentration of gas.

A controllable switching device 16 is connected to the accumulation chamber 14 and the reference gas source. The controllable switching device 16 is operable selectively to switch between opening a fluid path from the accumulation chamber 14 to the optical sensor or a fluid path from the reference gas source to the optical sensor. In the example shown, the reference gas used is air, which is drawn into the system via a tube that is open to the atmosphere at one end. When the pump and sampling system is running, the controllable switching device 16 is able selectively to allow a sample gas from the accumulation chamber 14 or the reference gas to be drawn into the optical sensor for analysis. Hence, in one position the switching device 16 delivers only gas from the accumulation chamber 14 to the optical sensor. In a second position, the switching device delivers only reference gas to the optical sensor.

Figure 2A:
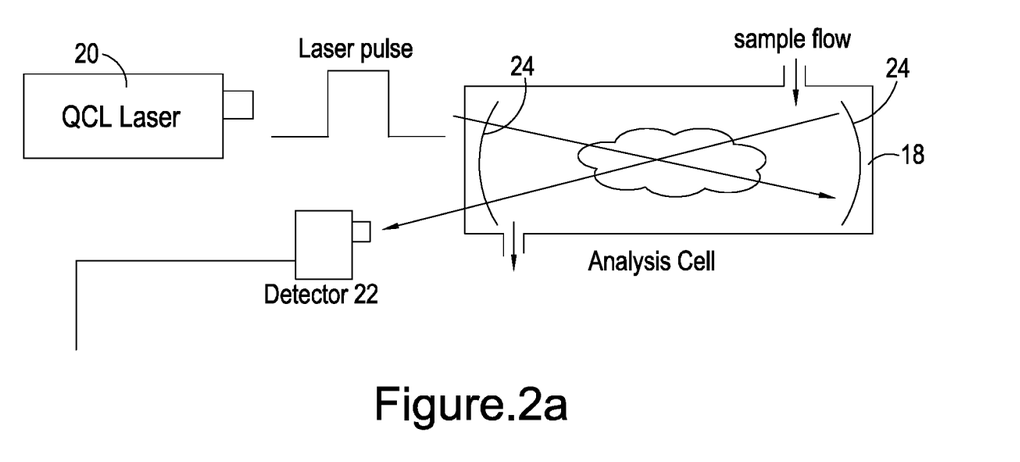
FIG. 2(a) is a schematic diagram of an optical sensor for use in the system of FIG. 1.

FIG. 2(*a*) shows the optical sensor. This includes the optical detection cell 18, a laser 20, for example a quantum cascade laser, and a detector 22 with software designed to analyse absorption of the laser light by propellant which has leaked from the can. When the pump and sampling system are running, gas flows into the detection cell 18 via an inlet and is drawn out of the cell 18 via an outlet. The laser diode 20 is operable to output light of a wavelength that is matched to peak optical absorption lines of the gas that is to be leak tested (typically the propellant). The pulses output by the quantum cascade laser 20 are chirped and typically have pulse durations in the range of 100-1000 ns, and preferably in the range 200-500 ns. The optical analysis cell 18 is a closed cell in which two mirrors 24 are provided. Light from the laser diode 20 is reflected between the two mirrors 24 multiple times, so that it makes multi-passes through the cell 18. After multiple passes, light exits the cell 18 and is detected by the detector 22.

Figure 2B:
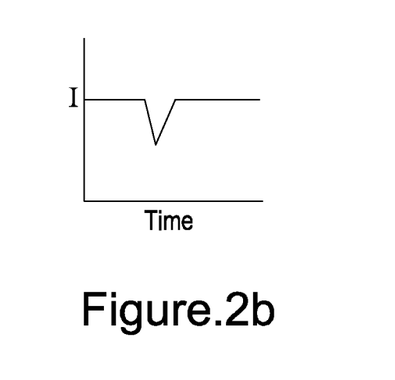
FIG. 2(b) shows a plot of intensity vs time for measurements taken using the sensor of FIG. 2(a) in the presence of a leaked gas.

The optical sensor of FIG. 2(*a*) uses absorption techniques to detect leaked gas. In the absence of the leaked gas to which the laser output is tuned, the intensity of the detected light should be relatively constant. In the presence of leaked gas a dip in the intensity of the detected light will be seen. This is because the leaked gas causes a partial absorption of light in the cell. This is shown in FIG. 2(*b*). This change in intensity can be used to determine both the presence and magnitude of the leak. To ensure that changes in intensity are due to leaked gas, not other factors, the reference gas is used to provide a baseline/background measure of the system response. The reference gas measurements are taken in the same optical cell as the accumulation chamber measurements, and always precede the accumulation chamber measurements.

FIG. 2(*b*) shows a plot of intensity (I) at the detector 22 as a function of time over a period in which reference gas is used to purge the detection cell and then accumulation chamber gas is flowed through the cell. During this period the laser 20 continuously emits light pulses and the detector 22 constantly monitors the intensity (I) of the detected light. To determine whether a leak has been detected, a simple threshold can be set. Samples exceeding this threshold are flagged as leaked gas.

The rate of change of intensity of light reaching the detector is proportional to the rate of change of the concentration ($\Delta C$) of the target gas molecule. The rate of change of concentration in the cell is proportional to the difference in concentration between the accumulation chamber and the baseline measurement taken using the reference gas. The difference in concentration between the cell and the baseline is due to the size of the leak. Hence, the amount of change is correlated to the amount of gas that has leaked from the vessel. To provide an absolute measure of the leak, the system can be calibrated against a known leak rate.

Techniques for identifying and quantifying the rate of gas leaks using a sample signal and a reference/background signal are known in the art and so will not be described herein in detail.

In order to maximise sensitivity, the net volume of the accumulation chamber 14, i.e. the volume available to contain gas when the container 12 is within the chamber 14, is less than the volume of the detection cell 18. This ensures that all accumulated gas can be contained within the detection cell 18 at the same time.

In use, the laser 20 continuously emits light pulses and the detector 22 constantly monitors the intensity of the detected light. Leaks from the can are allowed to accumulate in the accumulation chamber 14. While this is happening, the switching device 16 is in its second position and the pump causes the reference gas, typically air, to flow through and purge the detection cell 18. At this stage, multiple absorption measurements are taken using the laser 20 and detector 22. These measurements are taken as the reference gas is flowed through the detection cell 18. These measurements are used as the baseline.

When an accumulation time has elapsed, the switching device 16 is switched to its first position to deliver only the sample in the accumulation chamber to the detection cell 18. As gas from the accumulation chamber flows into and through the optical cell, absorption measurements continue to be taken using the laser 20 and detector 22. If there is a leak, then the concentration of leaked gas gradually builds up and then reduces as the gas enters the cell via the inlet and then leaves via the outlet. This can be seen in FIG. 2(*b*), which shows the absorption intensity increasing and then decreasing. Therefore, the absorption measurements taken while the gas is flowing through the cell period provide a measure of differential leaked gas concentration. Typically, seven measurements are taken over a 100 ms to 500 ms period, each measurement providing a measure at a different leaked gas concentration. Of course, if there is no leak and only air is transferred from the accumulation chamber 14 then the measurements taken will show substantially no change.

Figure 3:
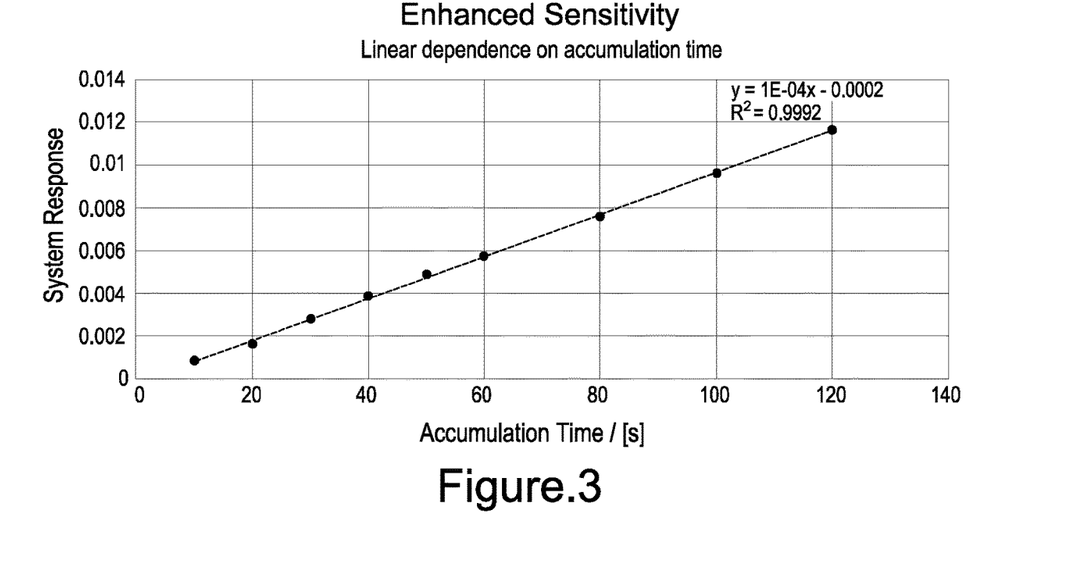
FIG. 3 is a plot of system response versus accumulation time for various leak detection tests.

The duration of the dwell time in the accumulation chamber 14 has an impact on the sensor response. The accumulation time is typically in the range of 2 seconds to 600 seconds. Ideally, the accumulation time is in the range of 2 seconds to 120 seconds, for example 2 seconds to 60 seconds. In practice, the duration of the dwell time in the accumulation chamber 14 linearly increases the sensor response. Experimental data demonstrating this is shown in FIG. 3.

Figure 4:
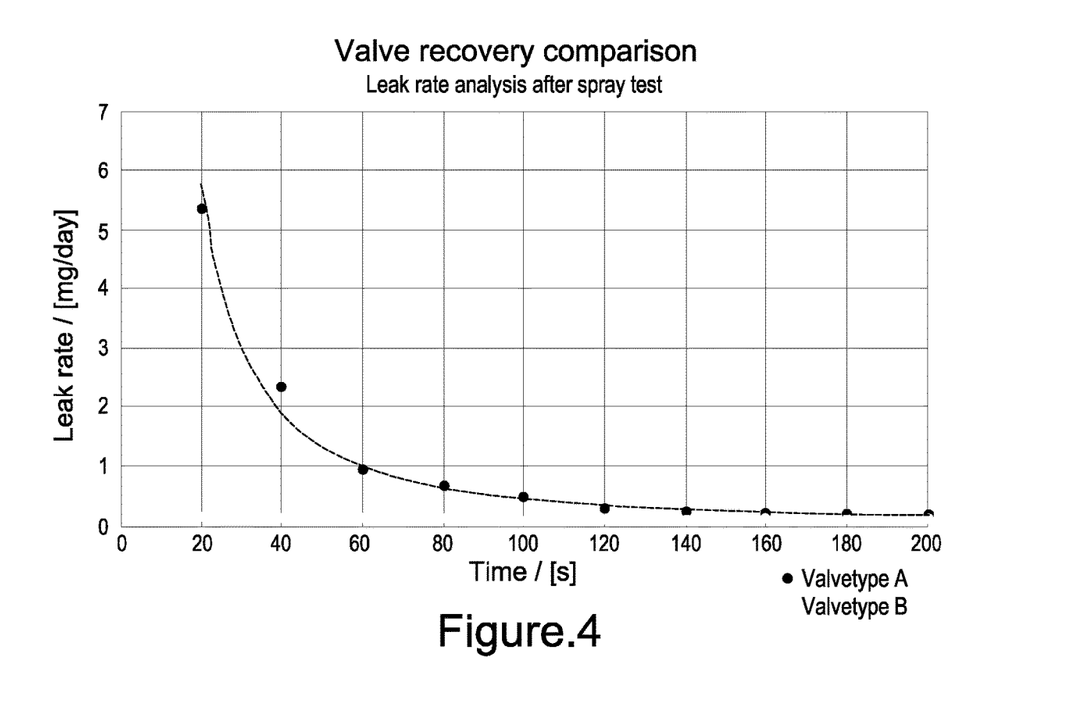
FIG. 4 is a plot of leak rate versus time for two different types of can.

By repeatedly cycling the accumulation process, a profile of the change in leak over time can be built. An example of this is shown in FIG. 4 in which the leak rate of two different cans 12 is compared over a few minutes immediately after the valve is activated.

Figure 5:
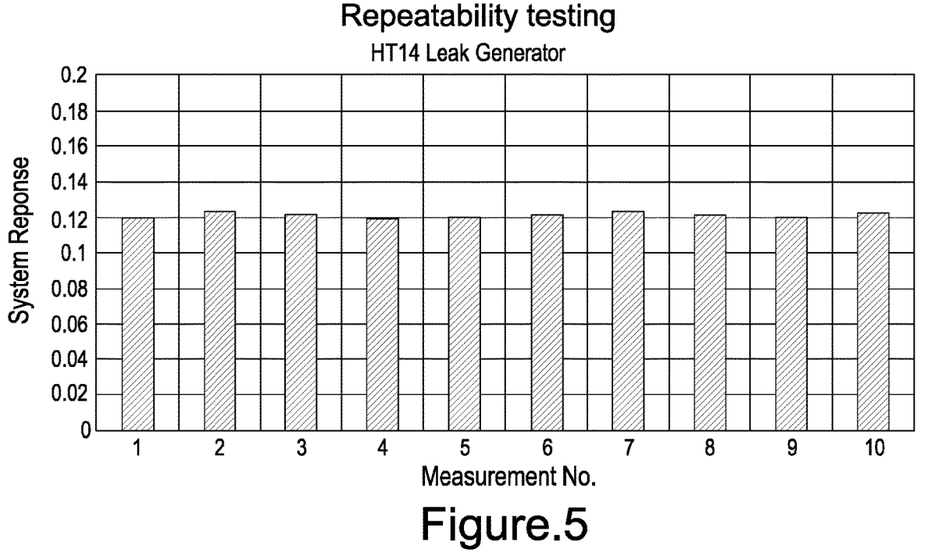
FIG. 5 shows the system response for ten different measurements.

The system of FIG. 1 allows for highly repeatable measurements. FIG. 5 shows the system response at a stable reference/test leak rate during repeated measurements. This demonstrates the high repeatability of the system.

Figure 6:
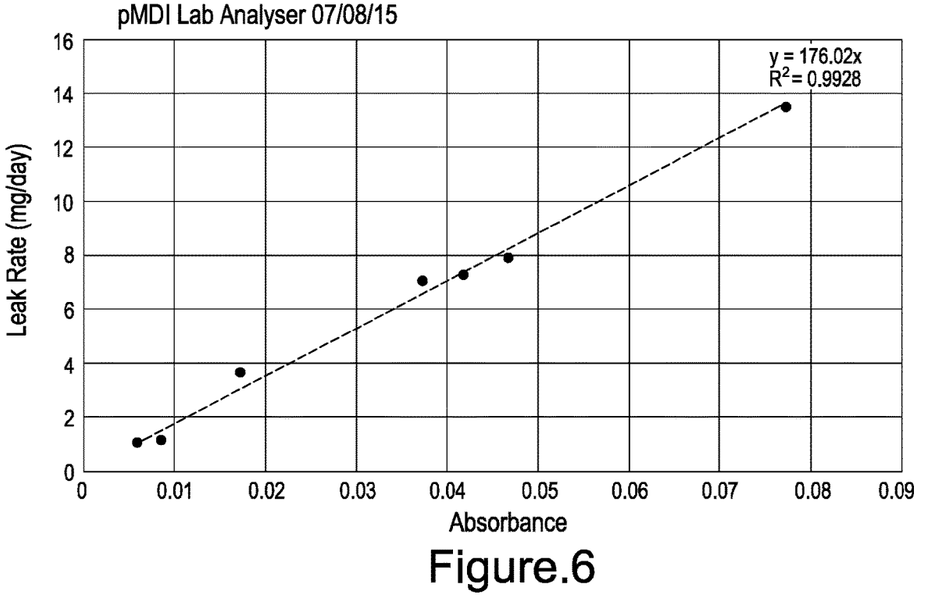
FIG. 6 is a plot of leak rate versus absorbance.

The magnitude of the leak and the length of the accumulation time determine the amount of gas that leaks into the accumulation chamber. At low concentrations of propellant, the amount of light absorbed by the propellant is approximately proportional to the amount of propellant in the sample. In addition, the amount of propellant in the sample is proportional to the magnitude of the leak. By virtue of this proportionality, the magnitude of the leak rate can be calculated based on the amount of light absorbed by the sample. FIG. 6 shows the proportionality of the response. In each case the leak rate of the test samples was confirmed by weight loss measurements carried out over a period of days.

Figure 7:
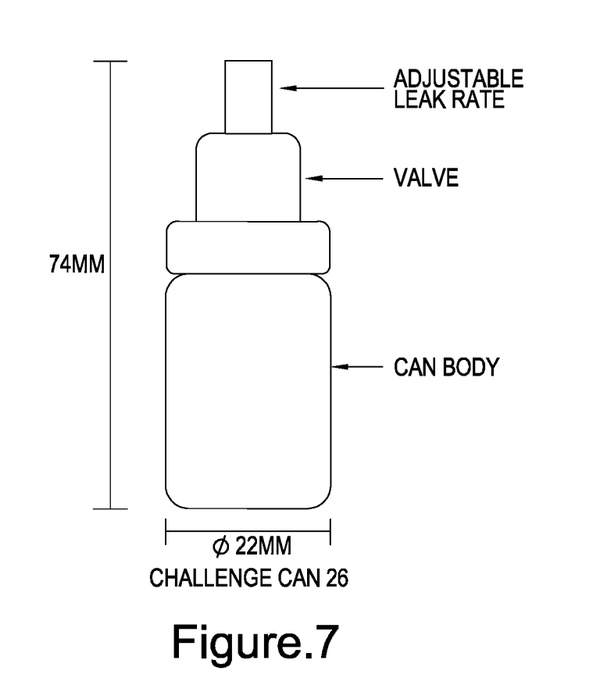
FIG. 7 is an example of a challenge can for use in leak detection tests.

Verification of the instrument response can be carried out by means of a challenge can. This is a modified canister capable of being fitted with a leak generating valve. The leak generating element consists of a sintered pellet that has been fabricated to provide a fixed permeability to the propellant of choice, for example R134a. Under constant temperature conditions, the liquefied propellant in the canister provides a fixed internal pressure. This property guarantees a stable and continuous leak of propellant through the sintered pellet. The challenge can is shaped to have the same cross section profile of a standard product can. Therefore, it is able to be inserted into the general handling of cans for verification of the leak detection device. FIG. 7 shows an example implementation of the challenge can.

Figure 8A:
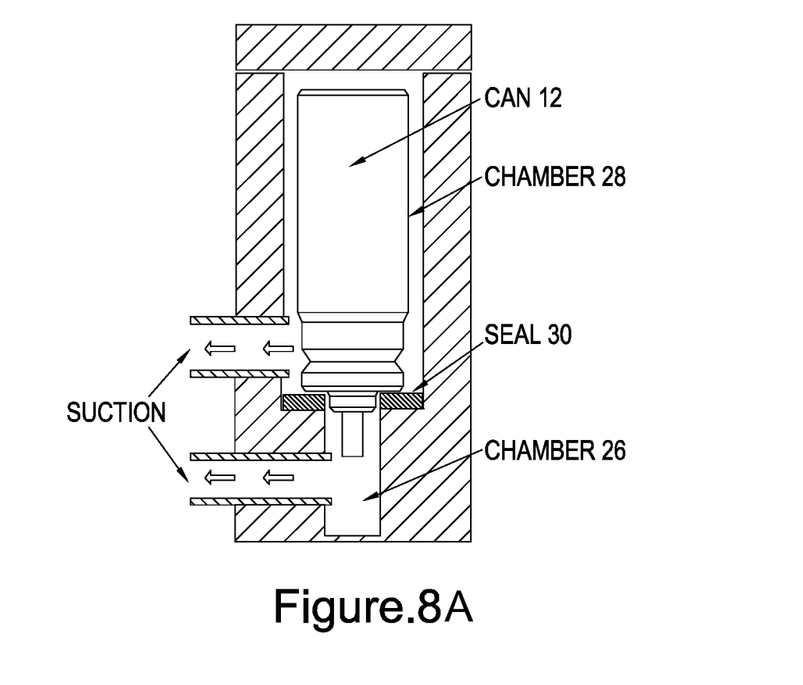
FIGS. 8A and 8B are schematic views of an accumulation chamber designed to identify leaks at different locations on an aerosol can.
Figure 8B:
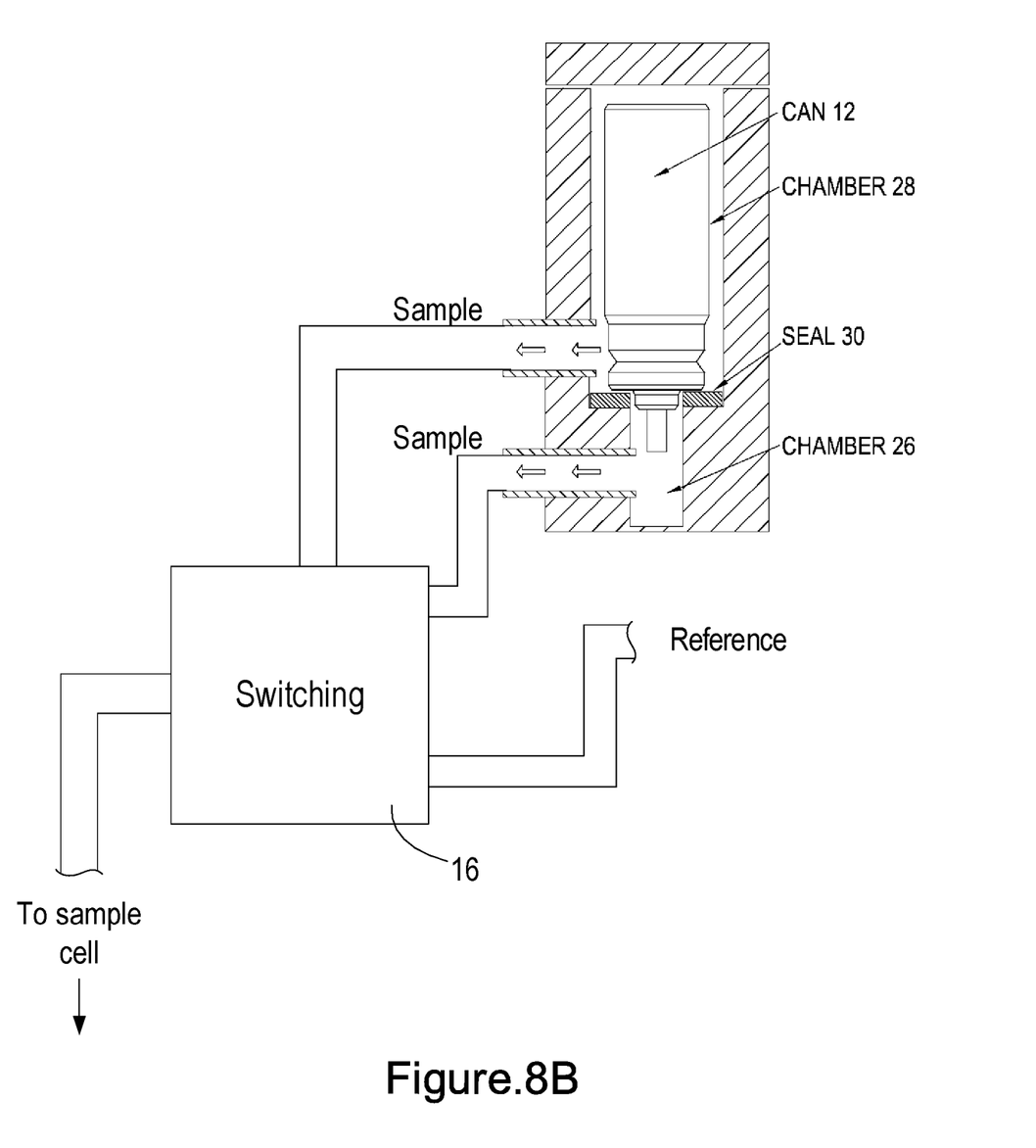

FIGS. 8A and 8B show a modified accumulation chamber 14 for use in the system of FIG. 1. As before this is sized to accommodate a single canister 12 and is sealed so that any leak can accumulate quickly. In this case, however, the interior of the chamber 14 is modified so that when the can 12 is in place two distinct accumulation chambers 26 and 28 are defined, one 26 for detecting leaks in the canister valve (the valve chamber) and the other 28 for detecting leaks in the canister crimp (the crimp chamber). Between the two chambers 26 and 28 is a seal 30 that extends around the entry to the valve chamber. When the canister 12 is in position its shoulder bears down on the seal 30, so that the valve and crimp chambers are isolated from each other. It should be noted that the accumulation chamber 14 of FIGS. 8A and 8B is adapted to accommodate the container in an upside down position, i.e. with the valve facing downwards. This is advantageous, because it allows cans of different heights to be accommodated within the chamber 14.

Each of the valve and crimp chambers 26 and 28 has its own individual sampling path from its interior through the chamber wall. Each channel is connected via, for example, a tube or pipe to the controllable switching device 16 to allow fluid communication with the sample detection cell 18. Each chamber 26 and 28 can be sampled independently of the other. In this case the switching device 16 is arranged to switch between three different positions, rather than two. The three positions are the valve chamber 26; the crimp chamber 28 and the reference. By switching between the two independent chambers 26 and 28 and the reference, there is provided a means of independently assessing the leak rate from the valve and from the crimp, whilst still benefiting from the use of a reference sample.

In use, the laser 20 continuously emits light pulses and the detector 22 constantly monitors the intensity of the detected light. Leaks from the can 12 are allowed to accumulate in both the valve chamber 26 and the crimp chamber 28. While this is happening, the switching device 16 is in its third position and the detection cell 18 is purged by the reference sample, typically air. At this stage, absorption measurements are taken using the laser 20 and detector 22. As before, these measurements of the reference gas are used as a baseline. When a predetermined accumulation time has elapsed, the switching device 16 is switched to its first position to deliver the accumulated sample in the valve chamber 26 to the detection cell 18. As gas from the valve chamber 26 moves into and flows through the optical cell 18, absorption measurements are taken using the laser 20.

While the measurements are being taken, if there is a leak, then the concentration of leaked gas gradually builds up and the declines, and so the measurements provide a measure of differential leaked gas concentration. After the appropriate measurements are taken, the switching device 16 is returned to its third position and the detection cell 18 is purged again by the reference sample. As before, baseline measurements of the reference gas are taken. When another predetermined accumulation time has elapsed the switching device 16 switches to its second position to deliver the accumulated sample in the crimp chamber 28 to the detection cell 18 for measurement. As gas from the crimp chamber 28 moves into and through the optical cell, multiple absorption measurements are taken as a function of time. As before, while the measurements are being taken, if there is a leak, then the concentration of leaked gas in the cell 18 gradually builds up and then declines and so the measurements provide a differential measure of leaked gas concentration.

The leak detection system of the invention currently supports the detection of a range of propellants, the most common of which are shown in

TABLE 1

| Propellants |
| --- |
| Propane |
| Butane |
| R134a |
| N2O |
| CO2 |
| H2O |
| DME |
| R227 |

| Propellants |
| --- |
| Propane |
| Butane |
| R134a |
| N2O |
| CO2 |
| H2O |
| DME |
| R227 |

Figure 9:
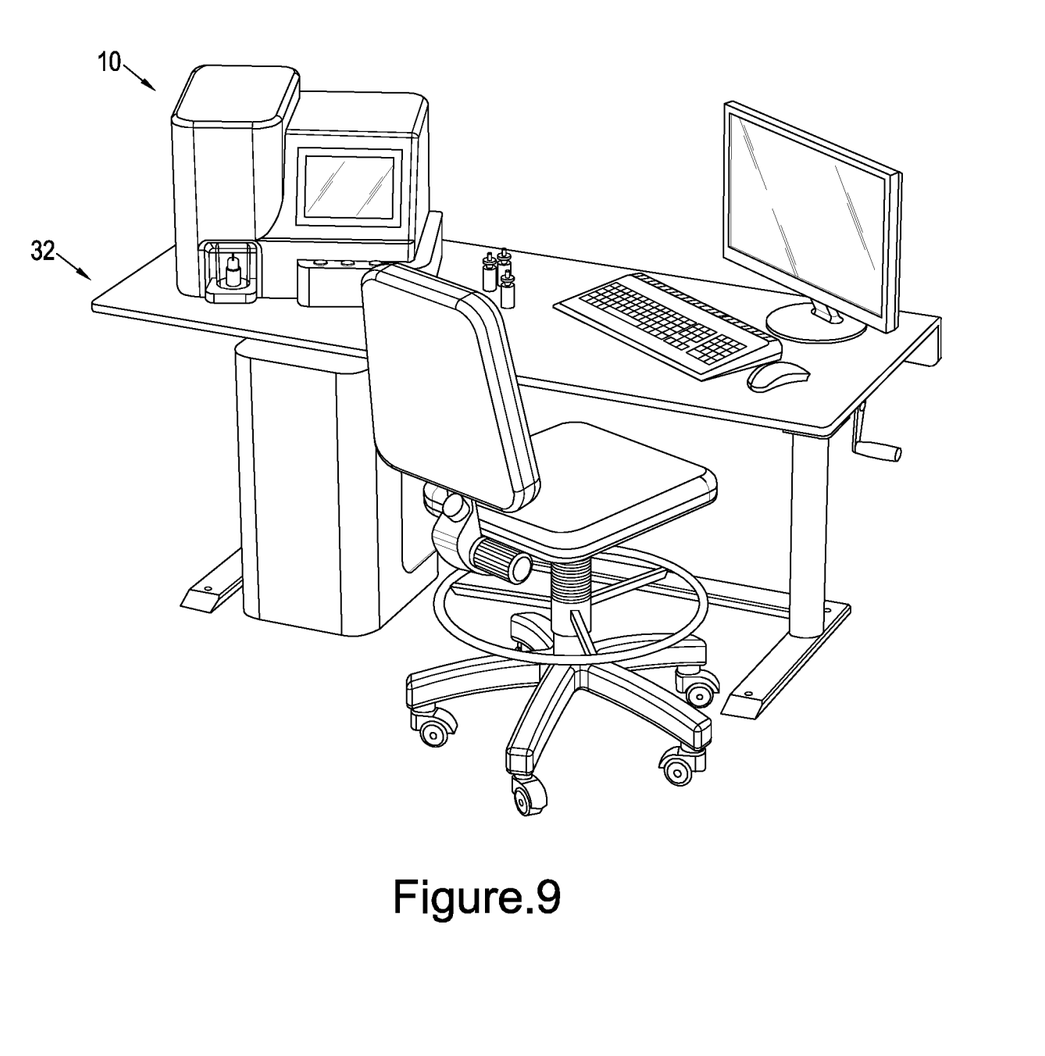
FIG. 9 is a pictorial view of a desktop implementation of the leak detection system.

The leak detection system 10 of the invention is very compact and may be installed on a typical work surface 32 such as a bench or desk, as shown in FIG. 9. The accumulation chamber and interface/display are suitable for a desktop environment and the sensor (with sample handling) can be located on the floor or on the desk.

The invention provides a simple, effective and extremely fast technique for detecting leaks. It can be applied to any similar application wherein the presence of propellant, headspace gases or ingredients from an enclosed vessel can be distinguished from that of the atmosphere and used to indicate the presence of a leak.

A skilled person will appreciate that variations of the disclosed arrangements are possible without departing from the invention. Accordingly, the above description of the specific embodiment is made by way of example only and not for the purposes of limitation. It will be clear to the skilled person that minor modifications may be made without significant changes to the operation described.

The invention claimed is:

1. A leak detection system for testing a single gas container comprising:
    a substantially sealed accumulation chamber adapted to accommodate the single gas container that has a valve and a crimp, the accumulation chamber being formed by an upper part that fits over the container and a base part configured to support the container in an upside down position with the valve facing downwards, wherein the accumulation chamber is sealed so that when a gas container is in the accumulation chamber, gas leaked from that container accumulates, wherein the accumulation chamber is adapted to accommodate the gas container in the upside down position with the valve facing downwards, and wherein the accumulation chamber is shaped such that when the container is in said upside down position in the chamber, a valve chamber is defined and a crimp chamber is defined, wherein a seal is provided such that when the container is in said upside down position a shoulder of the container bears down on the seal to thereby-to isolate the valve chamber from the crimp chamber;
    a reference gas source;
    an optical detector for detecting leaked gas, the detector including an optical cell, wherein the optical detector comprises a laser configured to continuously emit laser pulses and wherein the optical detector is configured to perform multiple measurements of the intensity of light;
    a controller comprising a switch arranged to switch between three positions for selectively switching, in a first position, the reference gas source, in a second position, the valve chamber, and in a third position, the crimp chamber into fluid communication with the optical cell, such that when the switch is in the first position the optical cell is purged by the reference gas and, wherein the controller is configured to control the switch to move from the first position to the second or third position after an accumulation time; and
    a first sampling path between the valve chamber and the switch, a second sampling path between the crimp chamber and the switch and a third sampling path between the reference gas source and the switch, wherein the first, second and third sampling paths are independent, and
    wherein the optical detector is configured to:
        perform measurements as reference gas is delivered to the optical cell during a first pre-determined accumulation time when the switch is in the first position to thereby provide a first plurality of measurements;
        continue to perform measurements as valve chamber gas is delivered to and flows through the optical cell when the switch is switched by the controller to the second position to thereby provide a second plurality of measurements as a function of time after the first accumulation time;
        use the first plurality of measurements of the reference gas and the second plurality of measurements of the valve chamber gas to provide a differential measure of leaked gas from the valve;
        perform measurements as crimp chamber gas is delivered to and flows through the optical cell when the switch is switched by the controller to the third position after a second pre-determined accumulation time to provide a third plurality of measurements as a function of time;
        continue to perform measurements as the crimp chamber gas is delivered to and flows through the optical cell when the switch is switched to the third position to provide a fourth plurality of measurements as a function of time after the second accumulation time; and
        use the third plurality of measurements of reference gas and the fourth plurality of measurements of crimp chamber gas to provide a differential measure of leaked gas as a function of time, wherein, the first and third plurality of measurements provide a baseline for the differential measure of leaked gas from the valve and the crimp chamber, respectively, and wherein, in the presence of a leak, each differential measure corresponds to a change in intensity of detected light over time relative to said baseline, wherein the change in intensity is representative of a concentration of leaked gas building up in the optical cell and then declining and wherein, in the absence of a leak, the intensity of detected light is substantially constant.

2. A leak detection system as claimed in claim 1, wherein the accumulation chamber is sized to accommodate a single aerosol canister.

3. A leak detection system as claimed in claim 1 adapted to use reference gas from the reference gas source to purge the optical cell.

4. A leak detection system as claimed in claim 1, wherein the optical detector comprises a quantum cascade laser.

* * * * *